(12) United States Patent
George et al.

(10) Patent No.: US 8,874,647 B2
(45) Date of Patent: Oct. 28, 2014

(54) COLLABORATION CAPABILITY SERVICE

(75) Inventors: Richard John George, Waterloo (CA); Brian Alexander Oliver, Fergus (CA); Joseph Patrick Thomas Goguen, Los Gatos, CA (US); Alan Panezic, Mississauga (CA); Peter John Devenyi, Waterloo (CA)

(73) Assignee: BlackBerry Limited, Waterloo (CA)

( * ) Notice: Subject to any disclaimer, the term of this patent is extended or adjusted under 35 U.S.C. 154(b) by 452 days.

(21) Appl. No.: 12/636,376

(22) Filed: Dec. 11, 2009

(65) Prior Publication Data

US 2011/0035447 A1    Feb. 10, 2011

Related U.S. Application Data

(60) Provisional application No. 61/232,292, filed on Aug. 7, 2009.

(51) Int. Cl.
*G06F 15/16* (2006.01)
*H04L 29/08* (2006.01)

(52) U.S. Cl.
CPC ............ *H04L 67/306* (2013.01); *H04L 67/327* (2013.01)
USPC ............................ 709/204; 709/205; 709/226

(58) Field of Classification Search
USPC ................................................ 709/205, 206
See application file for complete search history.

(56) References Cited

U.S. PATENT DOCUMENTS

| | | | |
|---|---|---|---|
| 7,577,704 B1 * | 8/2009 | Hegde | 709/205 |
| 2005/0071207 A1 | 3/2005 | Clark et al. | |
| 2010/0121666 A1 * | 5/2010 | Niazi | 705/8 |
| 2010/0296640 A1 * | 11/2010 | Stucker et al. | 379/93.17 |
| 2010/0325214 A1 * | 12/2010 | Gupta | 709/206 |

FOREIGN PATENT DOCUMENTS

| | | |
|---|---|---|
| EP | 1648144 A | 4/2006 |
| EP | 1713234 A | 10/2006 |
| WO | 0243351 A | 5/2002 |

OTHER PUBLICATIONS

EP 09178985.9—Search Report(Mar. 5, 2010).
Office Action mailed Apr. 5, 2013, in corresponding Canadian patent application No. 2711870.
Office Action mailed Apr. 26, 2012, in corresponding Canadian patent application No. 2,711,870.
Examination report mailed Nov. 21, 2011, in corresponding European patent application No. 09178985.9.
Examination report mailed Aug. 1, 2011, in corresponding European patent application No. 09178985.9.

* cited by examiner

*Primary Examiner* — Glenford Madamba
(74) *Attorney, Agent, or Firm* — Novak Druce Connolly Bove + Quigg LLP

(57) ABSTRACT

Providing collaboration services in a data processing system. Receiving a collaboration session request including identification of at least one collaboration resources. Determining availability of at least those collaboration resources identified in the request. Composing proposed collaboration session plans as a function of the availability of the collaboration resources. Presenting the plans to at least one stakeholder. Receiving a selection from among presented plans. Implementing the selected plan by initiating a collaboration session.

14 Claims, 5 Drawing Sheets

COLLABORATION CAPABILITY SERVICE

CROSS REFERENCE TO RELATED APPLICATIONS

The present disclosure claims priority to and the benefit under 35 U.S.C. §119(e) of U.S. Provisional Application Serial No. U.S. 61/232,292 filed Aug. 7, 2009. Said application is incorporated herein by reference in its entirety.

FIELD

The technology disclosed herein relates to telecommunications and software applications enabled for collaboration. More specifically, the technology relates to dynamic selection of collaboration channels.

BACKGROUND

Electronic telecommunication services, e.g., e-mail, social networking websites, instant messaging, voice and video telephony, and video conferencing, can be characterized by the degree of presence provided by the service. For example, conventional e-mail provides only the most attenuated degree of presence between a writer and a reader. Tele-presence systems incorporate real-time audio, real-time/real-scale high-definition video, and multiuser software applications among participants across several locations, represent state-of-the-art in degree of presence, and offer opportunities for richer collaboration among participants.

Convergent mobile telecommunications technology, e.g., devices that support video, voice, and data communication, web browsing, software applications, along with features such as geo-location and non-communication personal digital assistant (PDA) functions are in widespread use. These devices offer the opportunity for un-tethered collaboration. Each of these types of communication can be configured for various degrees of immediacy and interactivity. For example, video communication can provide: real-time dynamic interaction between participants through the use of full duplex video teleconferencing, passive viewing of a live video stream, and passive viewing of a downloaded video file. Voice communication can be real-time full duplex voice-grade channel communication as over the public switched telephone network (PSTN), real-time half duplex communication offered by most push-to-talk (PTT) services, or voice mail. Data communication can range from simple file transfer, to single user posting on a social network web page, to e-mail, to multi-user concurrent editing of a document.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

The opportunity for un-tethered collaboration offered by convergent mobile telecommunications technology presents challenges that include choosing between appropriate telecommunications services over time. Typically, selection of the appropriate communications service resides with the person who initiates the collaboration session, regardless of the preferences of the receiving parties or the enterprise supporting the communication. While receiving parties and supporting enterprises can employ means such as roll-to-voice mail, e-mail filters, and selecting when to log on to an instant messaging system, such approaches are reactive, typically require an enterprise or user to configure each application separately, and typically are not responsive to changing conditions. Current convergent telecommunications devices do not provide for sufficiently automated use of the device and telecommunications systems to establish the most appropriate service for communication given user, organization, and system constraints.

Figure 1:
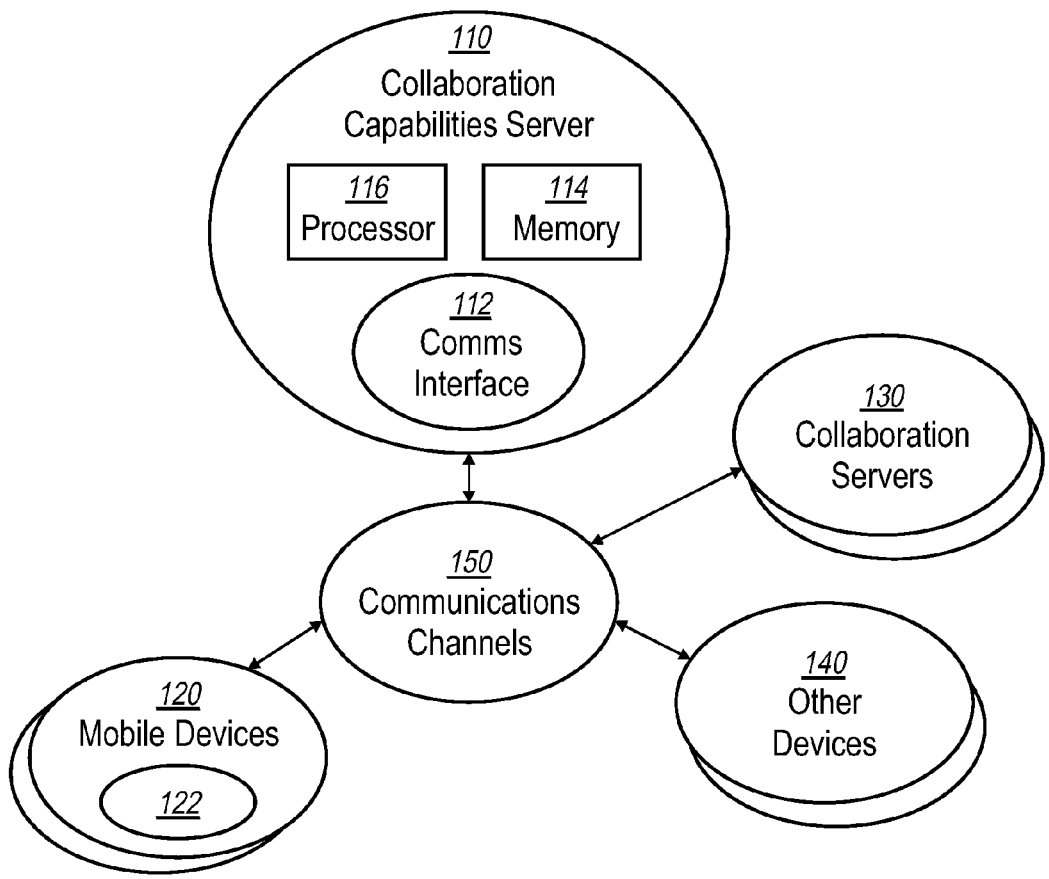
FIG. 1 illustrates an information technology architecture used in embodiments of the present technology.

Referring to FIG. 1, an architecture for a system 100 in accordance with the present technology is shown. The architecture includes a collaboration capabilities server 110, mobile devices 120, collaboration servers 130, and other devices 140, each with access to one or more communications channels 140.

The collaboration capabilities server 110 platform can be any one or more general purpose computing systems known to provide sufficient processing resources and interfaces to operate an enterprise-wide server and properly scaled to an anticipated number of devices, e.g., Intel® Pentium® IV processor (2 GHz or greater), 1.5 GB RAM, Microsoft SQL Server Desktop Engine (MSDE), Windows® 2000 Server (Server or Advanced Server Editions) or Windows Server® 2003. Collaboration capabilities server 110 functionality and the relationship of the collaboration capabilities server 110 to other elements of the architecture are described in the remainder of this disclosure. While shown as a single entity in FIG. 1, the collaboration capabilities server 110 and its functionality can be distributed across platforms.

The communications channels 150 can include various known carriers, either singly or in combination, of video, voice, and data, e.g., Public Switched Telephone Network (PSTN), Internet, dedicated links, private branch exchange (PBX) phone and voice mail systems, and wireless networks including 3G networks.

In addition to being configured to operate within the present technology, mobile devices 120 (described in more detail later in this disclosure) are configured to communicate with other devices, both mobile and fixed, both end user and server in known fashions (further described later in this disclosure). The Blackberry® Bold™ is an exemplary mobile device 120 used in the architecture 100. Mobile devices 120 can be programmed with collaboration applications 122, e.g., client portions of e-mail application such as Microsoft Outlook served by a collaboration server 130, peer-to-peer Instant Messaging (IM) applications, collaboration-enabled word processing applications.

Collaboration servers 130 include tele-presence servers, e-mail servers (e.g., Microsoft Exchange Server), IM servers, servers offering concurrent word processing, and even massively multiplayer online role-playing game (MMORPG) servers.

Other devices 140 include those known in the typical desktop device cluster, e.g., personal computers, full-featured or networked telephones.

Instead of allowing a collaboration requester to dictate the terms of a collaboration session, embodiments of the present technology receive input regarding collaboration preferences from session stakeholders; determine which collaboration resources (e.g., communications channels, collaboration applications) are available to the requester and invitees (collectively "participants"); determine a set of candidate collaboration plans for the session; facilitate choice of a plan from among the determined plans (including facilitate negotiations between proposed participants where appropriate); implement the chosen plan; and update the chosen plan based on ongoing status of stakeholder preferences and collaboration resources.

Figure 2:
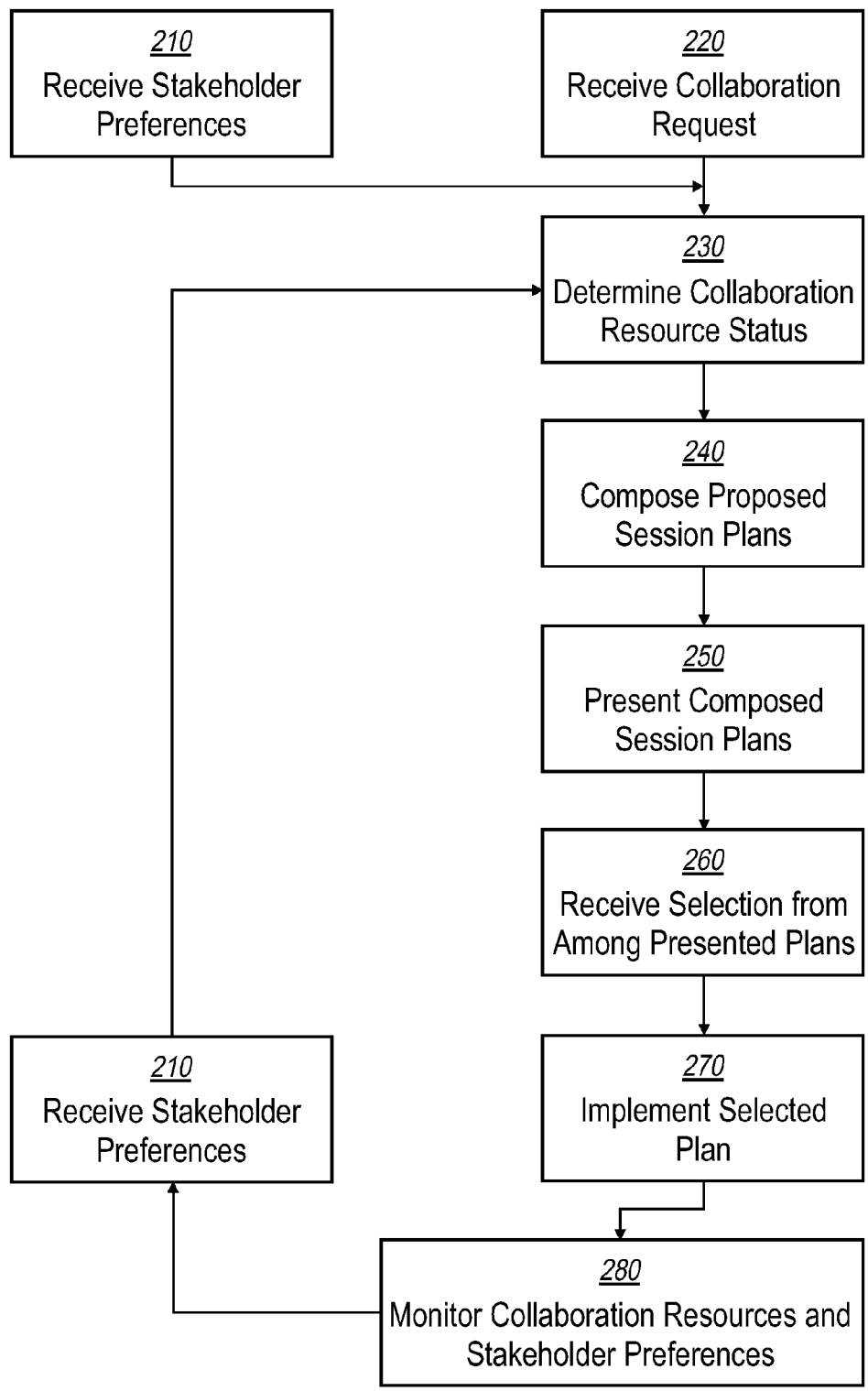
FIG. 2 illustrates a method for establishing collaboration services.

Referring to FIG. 2, an exemplary method 200 of the technology is shown. The proposed participants may have preferences regarding collaboration session characteristics such as time, immediacy, degree of interaction, and particular application(s) to use. For example, while outside the office, a user is willing to accept e-mail, but not IM messages or telephone calls (unless the call is from the user's boss). While in a meeting, the user may set his status to "do not disturb" (or the equivalent thereof). In response the collaboration server can set that user's telephone status to "unavailable."

Stakeholders in a collaboration session include not only the participants, but also the enterprise providing the collaboration technology. The enterprise may have both technical objectives, e.g., efficient use of the communication channels 150, and management objectives, e.g., adherence to a chain of command. Treatment of phone calls received out of operating hours is an example of an enterprise preference. In this case the phone call can be recorded and sent to the employee as a voicemail attachment in an email. In another example, the enterprise has a wireless zone (achieved via the use of a well formed Wi-Fi hotspot) that covers an external meeting room. Whenever an employee is in that zone calls to his device can be disabled and the communication directed to e-mail instead.

Some preferences can be described as either user or enterprise preferences. For example, consider a doctor on call in an emergency room. While she is attending an emergency the only communications channel either she or the hospital considers open is the voice-activated push-to-talk, and even then only from the medical dispatcher. Thus the technology can show only this means of communication as available to only a medical dispatcher user.

As another example of stakeholder preferences, consider groups and distribution lists. A user can be disallowed from contacting a supervisor via telephone, but with both the user and the supervisor as members of an emergency response e-mail group the user can communicate with the supervisor. Other examples of stakeholder preferences include time of day availability restrictions, allowed and blocked contacts (e.g., telephone number, caller identity, e-mail address, IM identity) for each user, user described physical location of the user and the device, user status (e.g., "busy," "in a meeting").

Embodiments of the technology can solicit and receive such preferences from users and other stakeholders 210, including receiving such preference information asynchronously from receiving a collaboration request. Solicitation and receipt of stakeholder preferences, along with subsequent actions of the technology, can be implemented through programming of the collaboration capabilities server A10, and devices A20, A30. Collaboration applications typically allow stakeholders to specify preferences. The present technology can use preferences already specified by user in collaboration applications reachable via the communications channels without specifically prompting stakeholder to re-enter those preferences. Registration of users in the collaboration technology, communications systems, and collaboration applications can be performed by methods known to those skilled in the art of the technology.

A user of the technology may wish to initiate a collaboration session with one or more other users of the technology. Embodiments of the technology can receive a collaboration request 220 from an appropriately registered user regardless of whether the user previously provided preference information. The request can specify collaboration parameters such as an anticipated duration of the collaboration, invitees, and requested collaboration resources. Each parameter can comprise a list of acceptable elements appropriate to the parameter. Such a list can be a list of prioritized elements. While a more detailed request is preferred, the technology can treat conventional communication attempts at collaboration, e.g., sending an e-mail, as a collaboration request.

Requesting can be an interactive process between the technology and the requester, e.g., prompting the requester to specify collaboration parameters, initially input stakeholder preferences, any change stakeholder preferences, or temporarily override stakeholder preferences.

As noted above, the collaboration capabilities server 110 interfaces with the communications channels 140, and through a subset of one to all of those channels communicates with mobile devices 120, other devices 140, and collaboration servers 130. At least in part through these interfaces, the collaboration capabilities server collects information B30 regarding the nature and availability of communications channels and collaboration applications at mobile devices 120, other devices 140, and collaboration servers 130. Collectively, the communications channels between elements of the technology and collaboration applications at such elements comprise the collaboration resources. Since the requested session is expected to extend over a period of time, the collaboration capabilities server A10 preferably initially determines the capabilities for the entire expected period.

In some embodiments, the technology monitors the availability of a subset of the collaboration resources without the need for a collaboration request from an initiator. Since many collaboration resources typically are common to a significant subset of users, such an approach is more efficient than determining resource availability anew upon each collaboration request.

Figure 4:
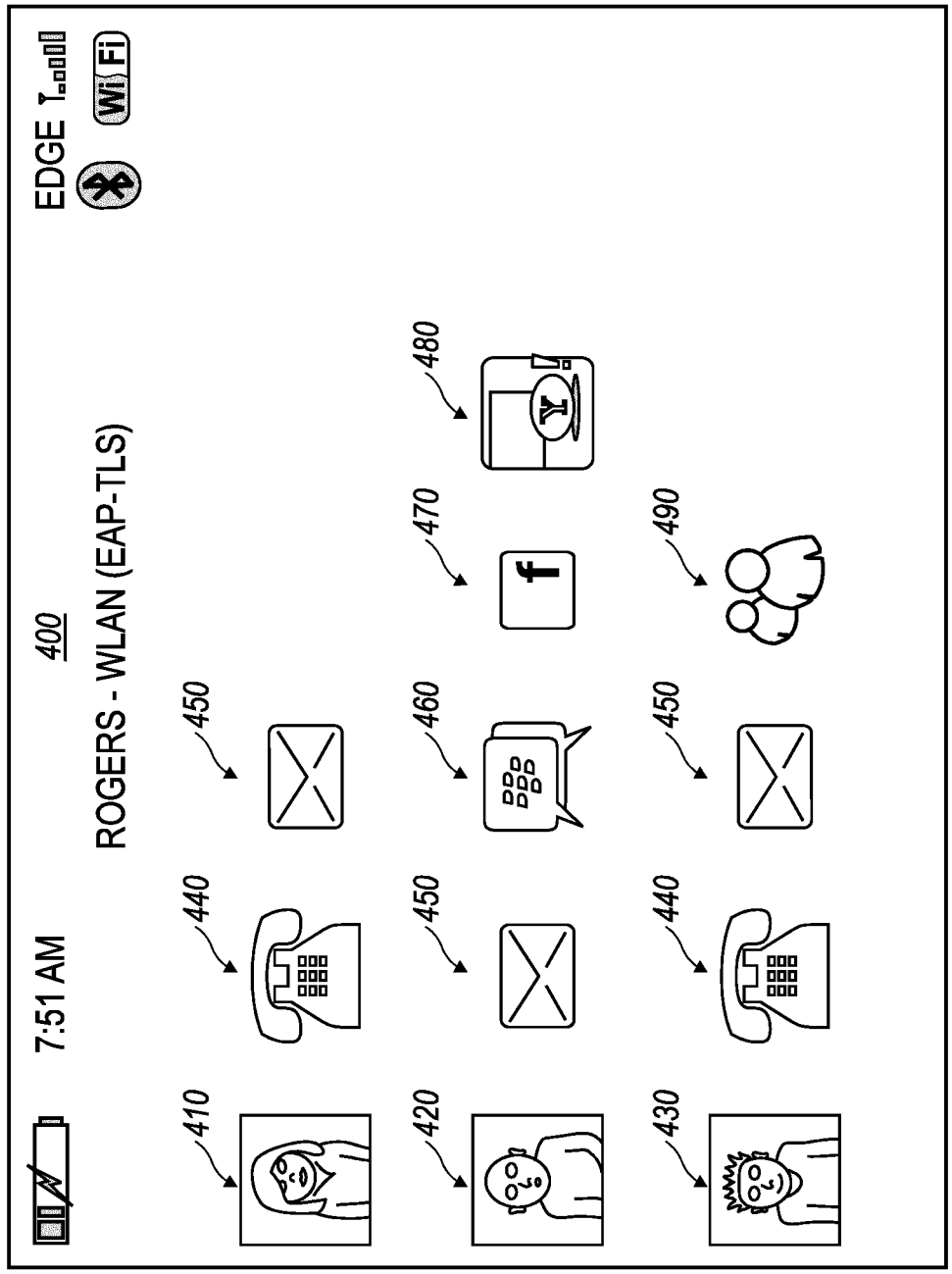
FIG. 4 illustrates a user interface of the present technology.

In some embodiments, the technology makes real-time status of a subset of users, collaboration resources, and collaboration sessions available to users, e.g., through a simple user interface that presents active sessions, contact information, and preferred collaboration channels for each contact. FIG. 4 illustrates one embodiment of such an interface 400 on a display of a mobile device 120. A first user icon 410, second user icon 420, and third user icon 430 are shown—though more than three users can be shown by properly sizing the icons for each user and employing a scroll bar. Collaboration information related to each user is shown in a row corresponding to each user icon—though other geometric arrangements can be used such as column, window, cluster. In the illustrated embodiment, the collaboration icons represent collaboration resources available for that user, e.g., phone 440, and enterprise e-mail 450 are available for the first user; enterprise mail 450, IM 460, social network page 470, and web-based mail 480 are available for the second user; and phone 430, enterprise mail 440, and Microsoft® Office Communicator 490 are available for the third user. The user icons and associated collaboration information can be ordered in various ways, e.g., from top to bottom when ordered vertically, alphabetically, by most recent contact, by frequency of contact, with certain user icons and collaboration information always on top, in accordance with display thresholds (a contact appears on the list only after a threshold number of collaborations with the window owner over a period of time). Collaboration information for certain users can be blocked.

Figure 5:
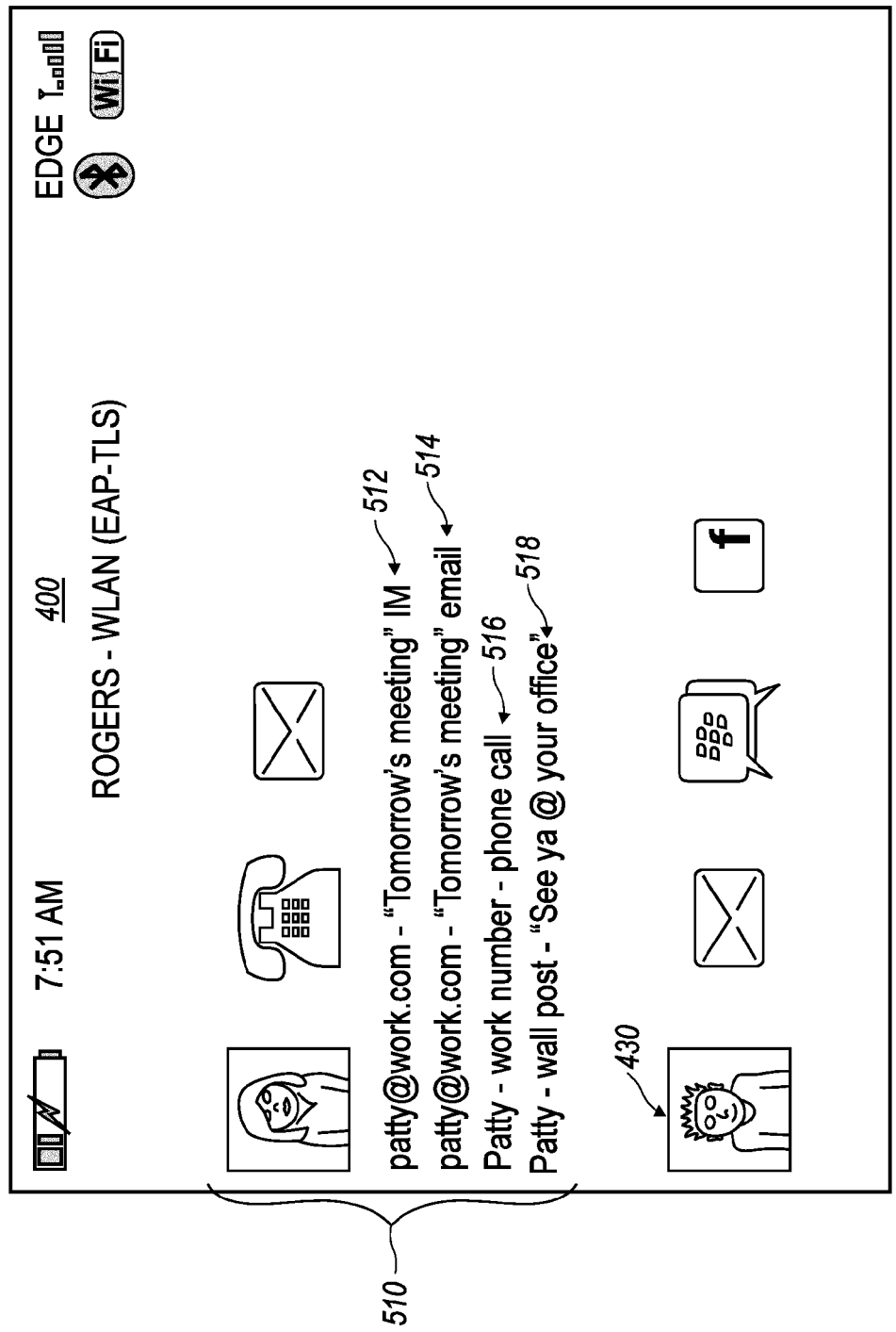
FIG. 5 illustrates a user interface of the present technology.

FIG. 5 illustrates the user interface of FIG. 4 with collaboration information for the first user expanded to show a single collaboration session 510. The session started with an IM indicated at 512, delegated to e-mail indicated at 514, escalated to a phone call indicated at 516, and delegated to a social networking site post 518. Further, second user's status 430 has changed from that shown in FIG. 4, e.g., web-based e-mail using Yahoo 480 is no longer shown a collaboration resource for that user.

The collaboration capabilities server 110 uses the received stakeholder preferences and the determined availability of collaboration resources to compose a set of proposed session plans 240 for the requested session. Given that a proposed session extends over a period of time, a session plan can call for multiple communication channels during the period. The technology can propose multiple collaboration channels, some overlapping in time. Given that the subject of a collaboration session may call for more than one collaboration application (e.g., video teleconferencing and collaborative word processing), a session plan may include more than one collaboration application. As with proposed collaboration channels, proposed collaboration applications can overlap in time.

A proposed session plan can comprise different collaboration resources over time for individual participants. For example, if the expected duration of the requested session extends into a period where a subset of the expected participants do not have a full suite of collaboration resources available, e.g., after 5:00 p.m. full video teleconference is unavailable to some participants, then the collaboration resource for those participants is proposed to delegate to voice teleconference. For further example, a first portion of a session can be planned as a voice teleconference among a subset of the participants, while a subsequent portion of the session can be planned to be escalated to a video teleconference among all participants.

The set of proposed plans can include plans that do not comply with all the preferences of every proposed participant. Unless a user has permission to select such a plan in spite of the plan not complying with all the preferences of each proposed participant, such plans are subject to negotiation (as described below) between proposed participants before the plan can be selected. While embodiments of the technology seek to prepare session plans that are compliant with a collaboration session request, plans for which the technology has determined that collaboration resources will not be available are not prepared. A set of proposed plans can include plans that are noncompliant with stakeholder preferences. Such plans require either negotiation among stakeholders (described below) or an over-ride of stakeholder preference.

In accordance with certain embodiments of the technology, the planned persistence of a collaboration session can be function of a constraint implemented in various fashions, e.g., as an enterprise rule, a user preference. For example, an enterprise rule or a user preference can cause a collaboration service to escalate or delegate after a predetermined user-settable period of time. The service changed-to can be determined based on factors such as last service used, next available escalating service, next available delegating services. Other example of this change can be the call center, where after a pre-determined period of time, if the initial telephone call has not resulted in progress, the session is delegated to IM, so that the customer can be connected to a representative for further communications.

The technology can present the set of proposed session plans 250 to at least one stakeholder (preferably to at least the initiator). Presentation can be through a graphical user interface, e.g., similar to the interface described herein with regard to collaboration resource status. The technology can present plans characterized, e.g., ordered, rated, ranked, by one or more factors including: predicted reliability over the proposed period of the session, minimization of use of collaboration resources (particularly communications channels), and degree of compatibility with the preferences of one or more stakeholders. For example, given three composed plans with two of the plans having a predicted reliability of 80% over the proposed period of the session, either of the two plans having 80% reliability would be a most favorably characterized plan based on characterization by reliability.

Stakeholders may choose a plan, or provide further feedback (e.g., altered or more complete preference information) to the technology. In some embodiments, the feedback is used to negotiate among stakeholders toward one or more session plans that are compliant with resource availability and most consistent with the preferences of stakeholders. The technology can facilitate this negotiation through existing collaboration applications such as e-mail but more likely through a dedicated communication path between the stakeholders and the collaboration capabilities server 110. Certain stakeholders (e.g., the initiator, a supervisor, an invitee) can be allowed to select a plan regardless of consistency of the selected plan with preferences of other stakeholders. The technology can receive stakeholder input regarding the set of proposed plans 260.

Upon receiving input sufficient to choose from among the proposed session plans, the technology can implement the chosen session plan 270 using the collaboration resources. In some embodiments, input sufficient to choose from among the proposed session plans does not require choice of a single plan, but can be input sufficient to narrow the choice of plans. For example, negotiation reduced a set of seven proposed plans to a set of two proposed plan. The technology can implement the plan that provides a highest level of telepresence as determined through application of pre-determined criteria, e.g., least use of communications resources.

As a session progresses, both stakeholder preferences and the status of collaboration resources may change in an unplanned manner. The system can monitor the status of collaboration resources and user preferences 280 during a session and respond by methods including, e.g., automatic escalation or delegation according to the current stakeholder preferences and current status of collaboration resources 290, and proposing one or more new session plans 240.

For example, a VoIP-based video call is being streamed over Wi-Fi, and the user moves out of Wi-Fi coverage but remains in cellular coverage, then the technology can delegate the video call to a circuit-switched voice call based on the participants preferences. In such a situation, the technology can first propose that the user's device be reconnected as a circuit-switched voice call or as an IM window, and then delegate to the user's choice from among the proposed session plans.

In another example, a user participating in a circuit-switched voice call outside of Wi-Fi coverage moves into Wi-Fi coverage. The technology can either automatically escalate the user to a VoIP-based video call (consistent with all stakeholder preferences and the new availability of a communications channel with high presence), or propose this new session plan to the stakeholders before implementing it.

Figure 3:
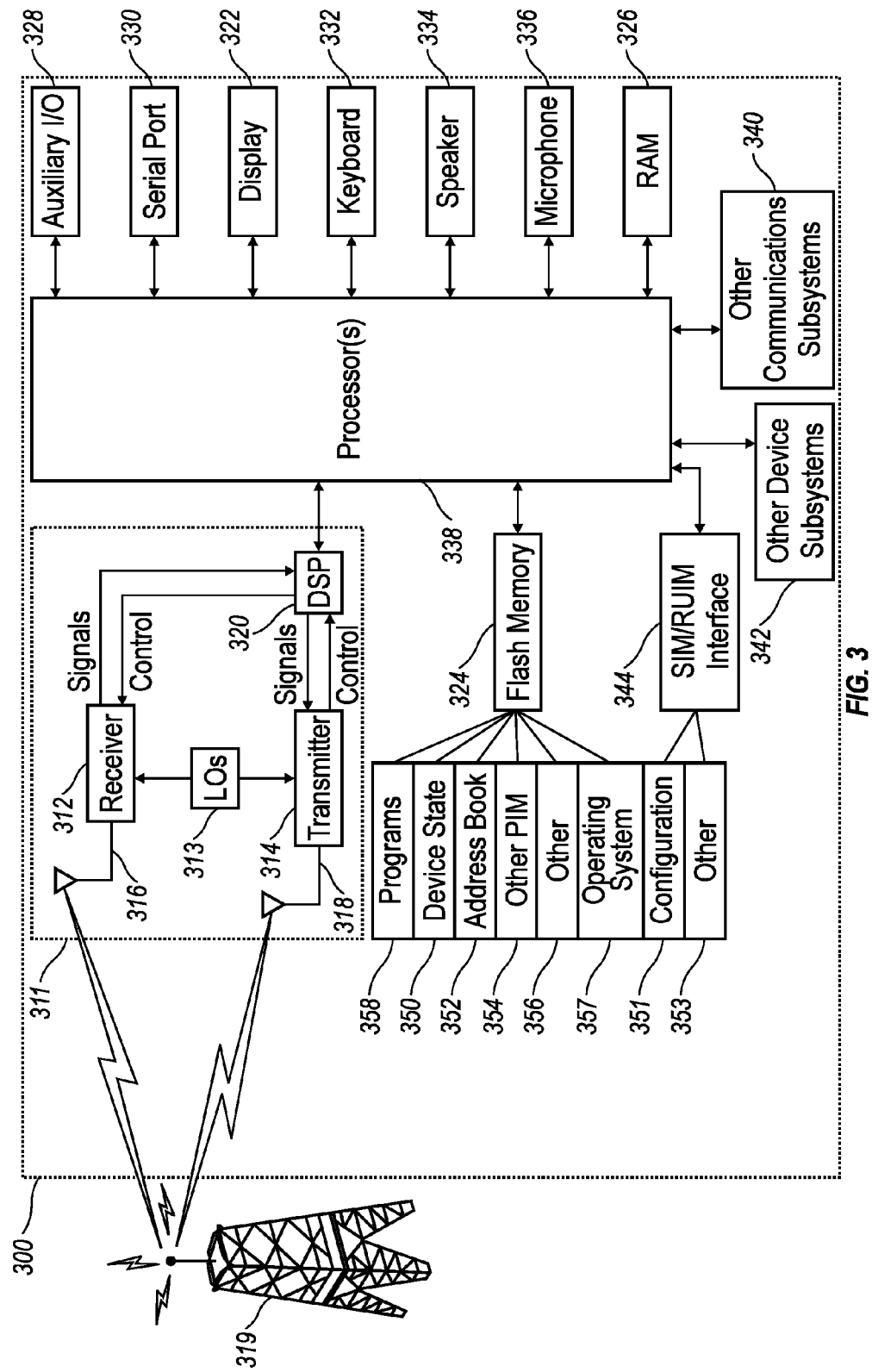
FIG. 3 illustrates a mobile device of the present technology.

Referring to FIG. 3, the mobile electronic device 300 can include a microprocessor module 338 that can control the operation of the mobile electronic device 300. A communication subsystem 311 can perform transmission and reception operations with a wireless network 309 or with a wired network (not shown). For example, the subsystem 311 can include a receiver 312, a local oscillator 313, a transmitter 314, a receive antenna 316, a transmit antenna 318 and a digital signal processor 320. The microprocessor module 338 further can be connected with an auxiliary input/output (I/O) subsystem 328, which can be connected to the mobile electronic device 300. In at least one embodiment, the microprocessor module 338 can be connected to a serial port 330 (for example, a Universal Serial Bus port), which can allow for communication with other devices or systems. The display 322 can be connected to the microprocessor module 338 to allow for displaying of information to an operator of the mobile electronic device 300. When the mobile electronic device 300 is equipped with a keyboard 332, the keyboard 332 can also be connected with the microprocessor module 338. The mobile electronic device 300 can also include a speaker 334, a microphone 336, random access memory (RAM) 326, and flash memory 324, all of which can be connected to the microprocessor module 338. Other similar components can also be provided on the mobile electronic device 300 and optionally connected to the microprocessor module 338. Other communication subsystems 340 and other communication device subsystems 342 are generally indicated as being functionally connected with the microprocessor module 338, as well. An example of a communication subsystem 340 is a short range communication system, such as a BLUETOOTH® communication module or a WI-FI® communication module (a communication module in compliance with any of the IEEE 802.11 set of protocols) and associated circuits and components.

The microprocessor module 338 is able to perform operating system functions and enables execution of programs on the mobile electronic device 300. In some embodiments, not all of the above components can be included in the mobile electronic device 300. For example, in at least one embodiment the keyboard 332 is not provided as a separate component and is displayed as required on a dynamic touch display. In an embodiment having a dynamic touch display, the keyboard 332 can be displayed as a touchscreen keyboard. A touchscreen module can be incorporated in such an embodiment such that it is in communication with the microprocessor 338. When inputs are received on the touchscreen keyboard, the touchscreen module can send or relay messages corresponding to those inputs to the microprocessor 338.

The auxiliary input-output (I/O) subsystem 328 can take the form of a trackball navigation tool, a thumbwheel, a navigation pad, a joystick, touch-sensitive interface, or other I/O interface. Other auxiliary I/O subsystems can include external display devices and externally connected keyboards (not shown). While the above examples have been provided in relation to the auxiliary I/O subsystem 328, other subsystems capable of providing input or receiving output from the mobile electronic device 300 are considered within the scope of this disclosure. Other keys can be placed along the side of the mobile electronic device 300 to function as escape keys, volume control keys, scrolling keys, power switches, or user programmable keys, and can likewise be programmed accordingly.

Furthermore, the mobile electronic device 300 can be equipped with components to enable operation of various programs, as shown in FIG. 10. For example, the flash memory 324 can be enabled to provide a storage location for an operating system 304, device programs 358, and data. The operating system 304 is generally configured to manage other device programs 358 that are also stored in the memory 324 and are executable on the processor 338. The operating system 304 can honor requests for services made by device programs 358 through predefined program interfaces. More specifically, the operating system 304 typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 304 through any suitable user interface. While in one example the operating system 304 can be stored in flash memory 324, the operating system 304 in other embodiments can be stored in read-only memory (ROM) or another similar storage element (not shown). As those skilled in the art will appreciate, the operating system 304, device program 358 or parts thereof can be loaded in RAM 326 or other volatile memory.

In one embodiment, the flash memory 324 can contain programs 358 for execution on the mobile electronic device 300, including—but not limited to—an address book 352, a personal information manager (PIM) 354, and a device state 302. Furthermore, programs 358 and other information 356 including data can be segregated upon storage in the flash memory 324 of the mobile electronic device 300.

When the mobile electronic device 300 is enabled for two-way communication within the wireless communication network 309, it can send and receive messages from a mobile communication service. Examples of communication systems enabled for two-way communication include, but are not limited to, a General Packet Radio Service (GPRS) network, a Universal Mobile Telecommunication Service (UMTS) network, an Enhanced Data for Global Evolution (EDGE) network, a Code Division Multiple Access (CDMA) network, High-Speed Packet Access (HSPA) networks, Universal Mobile Telecommunication Service Time Division Duplexing (UMTS-TDD) networks, Ultra Mobile Broadband (UMB) networks, Worldwide Interoperability for Microwave Access (WiMAX) networks, Long Term Evolution (LTE) networks and other systems using other suitable protocols or standards that can be used for carrying data and voice, or just data or voice. For the systems listed above, the mobile electronic device 300 can require a unique identifier to enable the mobile electronic device 300 to transmit and receive messages from the communication network 309. Other systems may not require such identifying information. GPRS, UMTS, and EDGE use a Subscriber Identity Module (SIM) in order to allow communication with the communication network 309. Likewise, most CDMA systems use a Removable User Identity Module (RUIM) in order to communicate with the CDMA network. The RUIM and SIM card can be used in multiple different mobile electronic devices 300. A SIM/RUIM interface 344 located within the communication mobile electronic device 300 allows for removal or insertion of a SIM/RUIM card (not shown). The SIM/RUIM card features memory and holds key configurations 351, and other information 353 such as identification and subscriber related information. With a properly enabled mobile electronic device 300, two-way communication between the mobile electronic device 300 and communication network 309 is possible. It is also understood that the mobile electronic device 300 can be configured to communicate in asynchronous networks, such as when two or more mobile electronic devices communicate without the assistance of fixed network equipment.

If the mobile electronic device 300 is enabled as described above or the communication network 309 does not require such enablement, the two-way communication enabled mobile electronic device 300 is able to both transmit and receive information from the communication network 309. The transfer of communication can be from the mobile electronic device 300 or to the mobile electronic device 300. To communicate with the communication network 309, the mobile electronic device 300 in the presently described example, as noted earlier, can be equipped with a transmit antenna 318 for transmitting messages to the communication network 309. Likewise the mobile electronic device 300 in the presently described example is equipped with a receive antenna 316 for receiving communication from the communication network 309. In another arrangement, these antennae 316, 318 are combined into a single antenna (not shown). As one skilled in the art would appreciate, the antenna or antennae 316, 318 can be externally mounted on or internally mounted in the mobile electronic device 300.

Aspects described above can be implemented as computer executable code modules that can be stored on computer readable media, read by one or more processors, and executed thereon. In addition, separate boxes or illustrated separation of functional elements of illustrated systems does not necessarily require physical separation of such functions, as communications between such elements can occur by way of messaging, function calls, shared memory space, and so on, without any such physical separation. More generally, a person of ordinary skill would be able to adapt these disclosures to implementations of any of a variety of communication devices. Similarly, a person of ordinary skill would be able to use these disclosures to produce implementations and embodiments on different physical platforms or form factors without deviating from the scope of the claims and their equivalents.

The present technology can take the form of hardware, software or both hardware and software elements. In some embodiments, the technology is implemented in software, which includes but is not limited to firmware, resident software, microcode, an FPGA or ASIC, etc. In particular, for real-time or near real-time use as in a patient position monitor, an FPGA or ASIC implementation is desirable.

Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk— read only memory (CD-ROM), compact disk—read/write (CD-R/W) and DVD. Both processors and program code for implementing each as aspect of the technology can be centralized or distributed (or a combination thereof) as known to those skilled in the art.

Data processing systems suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such data processing systems can be multiprocessor and distributed across platforms separate geographically; with the computer programs resident and executable thereon being either centralized or distributed across platforms.

The invention claimed is:

1. A computer-implemented method for providing collaboration services, the method comprising:
in a data processing system,
receiving collaboration preferences including at least one enterprise preference;
receiving a collaboration session request identifying:
at least one collaboration resource;
determining availability of a first set of collaboration resources,
the first set of collaboration resources comprising one or more communication modalities and at least each collaboration resource identified in the collaboration session request;
composing at least one collaboration session plan, each collaboration session plan composed as a function of at least:
the determined availability of the first set of collaboration resources, and
the received collaboration preferences;
implementing the at least one composed collaboration session plan;
monitoring the status of the collaboration resources of the implemented collaboration session; and
upon a change in the monitored status of the currently implemented collaboration session plan:
the system dynamically and automatically escalating or delegating the currently implemented collaboration session plan in real-time by:
determining availability of a second set of collaboration resources, the second set of collaboration resources comprising at least those identified in the received collaboration session request;
composing at least one second collaboration session plan, each second collaboration session plan composed as a function of at least:
the determined availability of the second set of collaboration resources, and
the received collaboration preferences; and
implementing a second composed collaboration session plan.

2. The method of claim 1:
further comprising characterizing each composed collaboration session plan according to predetermined criteria; and
wherein the implemented composed collaboration session plan comprises the most favorably characterized plan.

3. A computer-implemented method for providing collaboration services, the method comprising:
in a data processing system,
receiving collaboration preferences including at least one enterprise preference;
receiving a collaboration session request identifying:
at least one collaboration resource;
determining availability of a first set of collaboration resources,
the first set of collaboration resources comprising one or more communication modalities and at least each collaboration resource identified in the collaboration session request;
composing at least one collaboration session plan, each collaboration session plan composed as a function of at least:
the determined availability of the first set of collaboration resources, and
the received collaboration preferences; and
presenting, for selection, information regarding each composed plan;
receiving first selection information from among the presented first set of collaboration session plans;
initiating a collaboration session based on the first selection information;
monitoring the status of the collaboration resources of the implemented collaboration session; and
upon a change in the monitored status of the currently implemented collaboration session plan:
the data processing system dynamically and automatically escalating or delegating the currently implemented collaboration session plan in real-time by:
determining availability of a second set of collaboration resources, the second set of collaboration resources comprising at least those identified in the received collaboration session request;
composing at least one second collaboration session plan, each second collaboration session plan composed as a function of at least:
the determined availability of the second set of collaboration resources, and
the received collaboration preferences; and
implementing a second composed collaboration session plan.

4. The method of claim 3:
wherein the received first selection information identifies a plurality of selected collaboration plans; and
initiating a collaboration session further comprises:
ranking the selected collaboration plans according to predetermined criteria, and
initiating a collaboration session based on the most favorably-ranked plan.

5. A computer program product, the computer program product comprising
a non-transitory computer-readable medium; and
at least one module residing on the medium, and operable upon execution by a processor to:
receive collaboration preferences including at least one enterprise preference;
receive a collaboration session request identifying:
at least one collaboration resource;
determine availability of a first set of collaboration resources,
the first set of collaboration resources comprising one or more communication modalities and at least each collaboration resource identified in the collaboration session request;
compose at least one collaboration session plan, each collaboration session plan composed as a function of at least:
the determined availability of the first set of collaboration resources, and
the received collaboration preferences;
implement a composed collaboration session plan;
monitor the status of the collaboration resources of the implemented collaboration session; and
upon a change in the monitored status of the currently implemented collaboration session plan:
dynamically and automatically escalate or delegate the currently implemented collaboration session plan in real-time, and:
determine availability of a second set of collaboration resources, the second set of collaboration resources comprising at least those identified in the received collaboration session request;
compose at least one second collaboration session plan, each second collaboration session plan composed as a function of at least:
the determined availability of the second set of collaboration resources, and
the received collaboration preferences; and
implement a second composed collaboration session plan.

6. The computer program product of claim 5:
wherein the received first selection information identifies a plurality of selected collaboration plans; and
initiating a collaboration session further comprises:
ranking the selected collaboration plans according to predetermined criteria, and
initiating a collaboration session based on the most favorably-ranked plan.

7. A collaboration capabilities server comprising:
a memory resource,
at least one communications channel interface,
processing resources coupled with the memory resource and each communications channel interface, and
at least one programming module stored on the memory resource and operable when executed on the processing resources to:
receive collaboration preferences including at least one enterprise preference;
receive a collaboration session request identifying:
at least one collaboration resource;
determine availability of a first set of collaboration resources,
the first set of collaboration resources comprising one or more communication modalities and at least each collaboration resource identified in the collaboration session request;
compose at least one collaboration session plan, each collaboration session plan composed as a function of at least:
the determined availability of the first set of collaboration resources, and
the received collaboration preferences;
implement a composed collaboration session plan;

monitor the status of the collaboration resources of the implemented collaboration session; and upon a change in the monitored status of the currently implemented collaboration session plan:

dynamically and automatically escalate or delegate the currently implemented collaboration session plan in real-time, and:

determine availability of a second set of collaboration resources, the second set of collaboration resources comprising at least those identified in the received collaboration session request;

compose at least one second collaboration session plan, each second collaboration session plan composed as a function of at least:

the determined availability of the second set of collaboration resources, and the received collaboration preferences; and implement a second composed collaboration session plan.

8. The collaboration capabilities server of claim 7 wherein:

the at least one programming module is further operable to characterize each composed collaboration session plan according to predetermined criteria; and the implemented composed collaboration session plan comprises the most favorably characterized plan.

9. A collaboration system comprising:

at least one collaboration capabilities server;

collaboration resources comprising:

at least one communications channel; and at least one collaboration server; and a plurality of mobile devices; and wherein:

each collaboration capabilities server, each collaboration server, and each mobile device are interconnected through at least one communications channel; and the collaboration capabilities server is operable to:

receive collaboration preferences including at least one enterprise preference;

receive a collaboration session request identifying:

at least one collaboration resource;

determine availability of a first set of collaboration resources, the first set of collaboration resources comprising one or more communication modalities and at least each collaboration resource identified in the collaboration session request;

compose at least one collaboration session plan, each collaboration session plan composed as a function of at least:

the determined availability of the first set of collaboration resources, and the received collaboration preferences;

implement a composed collaboration session plan;

monitor the status of the collaboration resources of the implemented collaboration session; and upon a change in the monitored status of the currently implemented collaboration session plan:

the collaboration capabilities server to dynamically and automatically escalate or delegate the currently implemented collaboration session plan in real-time, and:

determine availability of a second set of collaboration resources, the second set of collaboration resources comprising at least those identified in the received collaboration session request;

compose at least one second collaboration session plan, each second collaboration session plan composed as a function of at least:

the determined availability of the second set of collaboration resources, and the received collaboration preferences; and implement a second composed collaboration session plan.

10. The collaboration system of claim 9 wherein:

the collaboration capabilities server is further operable to characterize each composed collaboration session plan according to predetermined criteria; and the implemented composed collaboration session plan comprises the most favorably characterized plan.

11. A collaboration capabilities server comprising:

a memory resource, at least one communications channel interface, processing resources coupled with the memory resource and each communications channel interface, and at least one programming module stored on the memory resource and operable when executed on the processing resources to:

receive collaboration preferences including at least one enterprise preference;

receive a collaboration session request identifying:

at least one collaboration resource;

determine availability of a first set of collaboration resources, the first set of collaboration resources comprising one or more communication modalities and at least each collaboration resource identified in the collaboration session request;

compose at least one collaboration session plan, each collaboration session plan composed as a function of at least:

the determined availability of the first set of collaboration resources, and the received collaboration preferences; and present, for selection, information regarding each composed plan;

receive first selection information from among the presented first set of collaboration session plans;

initiate a collaboration session based on the first selection information;

monitor the status of the collaboration resources of the implemented collaboration session; and upon a change in the monitored status of the currently implemented collaboration session plan:

dynamically and automatically escalate or delegate the currently implemented collaboration session plan in real-time, and:

determine availability of a second set of collaboration resources, the second set of collaboration resources comprising at least those identified in the received collaboration session request;

compose at least one second collaboration session plan, each second collaboration session plan composed as a function of at least:

the determined availability of the second set of collaboration resources, and the received collaboration preferences; and implement a second composed collaboration session plan.

12. The collaboration capabilities server of claim 11 wherein:

the at least one programming module is further operable to characterize each composed collaboration session plan according to predetermined criteria; and the implemented composed collaboration session plan comprises the most favorably characterized plan.

13. A collaboration system comprising:

at least one collaboration capabilities server;

collaboration resources comprising:

at least one communications channel; and at least one collaboration server; and a plurality of mobile devices; and wherein:

each collaboration capabilities server, each collaboration server, and each mobile device are interconnected through at least one communications channel; and the collaboration capabilities server is operable to:

receive collaboration preferences including at least one enterprise preference;

receive a collaboration session request identifying:

at least one collaboration resource;

determine availability of a first set of collaboration resources, the first set of collaboration resources comprising one or more communication modalities and at least each collaboration resource identified in the collaboration session request;

compose at least one collaboration session plan, each collaboration session plan composed as a function of at least:

the determined availability of the first set of collaboration resources, and the received collaboration preferences; and present, for selection, information regarding each composed plan;

receive first selection information from among the presented first set of collaboration session plans;

initiate a collaboration session based on the first selection information;

monitor the status of the collaboration resources of the implemented collaboration session; and upon a change in the monitored status of the currently implemented collaboration session plan:

the collaboration capabilities server dynamically and automatically escalates or delegates the currently implemented collaboration session plan in real-time, and:

determines availability of a second set of collaboration resources, the second set of collaboration resources comprising at least those identified in the received collaboration session request;

composes at least one second collaboration session plan, each second collaboration session plan composed as a function of at least:

the determined availability of the second set of collaboration resources, and the received collaboration preferences; and implements a second composed collaboration session plan.

14. The collaboration system of claim 13 wherein:

the collaboration capabilities server is further operable to characterize each composed collaboration session plan according to predetermined criteria; and the implemented composed collaboration session plan comprises the most favorably characterized plan.

\* \* \* \* \*